(12) United States Patent
James

(10) Patent No.: US 12,534,140 B1
(45) Date of Patent: Jan. 27, 2026

(54) DEVICE FOR MOVING A HITCH ON A PICKUP BED OF A VEHICLE

(71) Applicant: Randall S. James, Dale, TX (US)

(72) Inventor: Randall S. James, Dale, TX (US)

( * ) Notice: Subject to any disclaimer, the term of this patent is extended or adjusted under 35 U.S.C. 154(b) by 0 days.

(21) Appl. No.: 19/097,783

(22) Filed: Apr. 1, 2025

(51) Int. Cl.
    *B62D 53/08* (2006.01)

(52) U.S. Cl.
    CPC ................................ *B62D 53/0828* (2013.01)

(58) Field of Classification Search
    CPC ............ B62D 53/0807; B62D 53/0828; B62D 53/0864; B62D 53/0835; B62D 53/0871
    See application file for complete search history.

(56) References Cited

U.S. PATENT DOCUMENTS

| | | | |
|---|---|---|---|
| 5,772,229 A | 6/1998 | Cattau | |
| 6,431,577 B1 * | 8/2002 | Chapman | B60P 1/6463 280/901 |
| 7,673,895 B1 | 3/2010 | Hesse et al. | |
| 8,342,558 B1 * | 1/2013 | Su | B62D 53/0814 280/441 |
| 9,150,067 B2 | 10/2015 | Hartleip et al. | |
| 9,186,942 B1 | 11/2015 | Waggoner et al. | |
| 9,849,738 B2 | 12/2017 | Guthard et al. | |
| 11,390,339 B2 | 7/2022 | Scruggs et al. | |
| 2003/0160429 A1 * | 8/2003 | McCoy | B62D 53/0807 280/433 |
| 2010/0044997 A1 * | 2/2010 | Burns | B62D 53/0828 280/433 |
| 2017/0217513 A1 * | 8/2017 | Keatley | B60D 1/488 |
| 2019/0061844 A1 * | 2/2019 | Wiegel | B62D 53/0864 |
| 2021/0300486 A1 * | 9/2021 | Curl | B62D 53/0814 |
| 2024/0262141 A1 * | 8/2024 | Collins | B60D 1/345 |

FOREIGN PATENT DOCUMENTS

| | | |
|---|---|---|
| EP | 0049587 B1 | 1/1986 |
| FR | 2938812 A1 | 5/2010 |

OTHER PUBLICATIONS

Pullrite; #3200 (14K) ISR SuperGlide 5th Wheel Hitch; https://www.pullrite.com/sites/default/files/docs/products/3200%20Owner%27s%20Manual%20%281%29.pdf; Rev B 9.8.22 RH.

* cited by examiner

*Primary Examiner* — Valentin Neacsu
*Assistant Examiner* — Abigail R Hymel
(74) *Attorney, Agent, or Firm* — HULSEY P.C.

(57) ABSTRACT

A device for moving a hitch on a pickup bed is disclosed. The device includes a pair of elongated rails placed at a distance from one another. Each of the elongated rails includes slant sections extending outwardly and an angle from a distal end of the elongated rail. Each elongated rail includes flat sections extending from the slant section. Each of the elongated rails includes wheels positioned underneath the flat sections. The elongated rails position on the pickup bed of a towing vehicle such that the wheels are in contact with the pickup bed. The device includes a jack for lifting and lowering the hitch. The elongated rails receive the hitch, and the wheels are moved over the pickup bed for loading and unloading of the hitch from the pickup bed. The device includes a rolling hitch carrier bench for storing the device holding the hitch when not in use.

12 Claims, 13 Drawing Sheets

DEVICE FOR MOVING A HITCH ON A PICKUP BED OF A VEHICLE

BACKGROUND OF THE INVENTION

Field of the Invention

The present invention relates to accessories for towing a vehicle. More specifically, the present invention relates to a device for moving a hitch on a pickup bed of a towing vehicle by a single individual.

Description of the Prior Art

It is known that a fifth wheel travel trailer is a mode of camping trailer that is generally towed by a ¾-ton or one-ton pickup truck or other towing vehicle. The fifth wheel trailer has a hitch connection (kingpin) coming down from the front end (pin box). The kingpin fits into a hitch placed in a pickup bed i.e., back end of, and affixed to, the pickup truck. The fifth wheel trailer's kingpin connection slides into, fits and locks into the hitch. The hitch includes "jaws" that are moved into place to firm up the hitch and the fifth wheel trailer kingpin. This allows the pickup to tow the fifth wheel trailer. The pin box also contains a cable that drops down from the pin box. The cable plugs into an electrical outlet in the pickup bed and allows a pickup electrical system to power the fifth wheel trailer. In some cases, an individual hitch frequently weighs from 150 pounds to 400 pounds (or more). Some of the heavier hitches are designed to come apart for some ease in installation or removal.

Typical fifth wheel hitches attach into the pickup bed in a variety of ways. One such method is referred to as a "standard rail" setup. In the "standard rail" setup, two "rails" are placed in the pickup bed, approximately even with the rear axle and stretching between the wheel wells in the pickup bed. The rails are installed in such a way that they are (effectively) permanently bolted onto the frame of the pickup bed (underneath the bed surface of the pickup) and the rails neither move nor are easily removed. While the rails are not exactly flat with the surface of the pickup bed, the rails do not substantially interfere with the use of the bed for general purposes when the fifth-wheel hitch is not in the pickup bed.

The standard rail method is an industry standard whereby the two rails placed into the pickup bed are constructed and placed in specified locations. The fifth wheel hitches include four extensions, one on each corner of the hitch, that are placed into slots in the rails as specified distances. The industry standard placements and measurements are used by many hitch manufacturers. Therefore, once a fifth wheel trailer purchaser (owner) has the rails placed into their pickup bed, that owner can acquire any one of a variety of manufactured hitches to fit into the standard rails to use. The hitch can be removed from the rails (and therefore the pickup bed), to allow the owner to store it when not in use.

Another method is referred to as a "factory installed" or "factory prep" system. In the factory installed system, the pickup truck manufacturer "preps" the pickup bed of a ¾ or one-ton pickup with pre-drilled holes in the pickup bed, along with strengthened frame adjustments under the pickup bed. The general construct of the hitch remains as discussed above, but the four leg extensions differ in that these extensions fit into the factory prep holes in the pickup bed and are turned by a handle mechanism to lock the hitch into the pickup bed. The factory installed method allows the pickup bed, when the hitch is removed, to be completely flat for use by the owner for general purposes, avoiding the "bumps" of the rails.

Yet another method includes use of a singular post "gooseneck" connection coming down from the fifth wheel pin box into the pickup bed. The gooseneck connection is a singular round (or square) pipe that descends from the pin box and rests over a ball joint connection below the pickup bed. When the fifth wheel trailer is detached from the connection in the pickup bed, the owner can remove the ball joint and can use the pickup bed for general purposes. The gooseneck connections are used predominantly in agricultural and equipment hauling purposes. While providing a solid connection, there is no capacity allowing smoother rides for the fifth wheel trailer.

Several attempts have been made in the past to provide a variety of attachment methods as discussed above. One such example is disclosed in a United States granted U.S. Pat. No. 9,849,738, entitled "Fifth wheel conversion hitch mounting system" ("the '738 Patent"). The '738 Patent discloses an underbed hitch mounting system. The mounting system may be utilized for towing vehicles wherein the mounting system may selectively accommodate either a fifth wheel hitch or a gooseneck hitch. The mounting system may include at least one rail capable of being connected to a vehicle frame, wherein the rail includes at least one socket. The socket may be engaged with a receiving member, wherein the receiving member may be engaged with a leg of a fifth wheel hitch. A mid rail may be connected to the rails and may include a hitch ball socket that is capable of engagement with a hitch.

Another example is disclosed in a United States granted U.S. Pat. No. 9,150,067, entitled "Underbed support assembly for fifth wheel and gooseneck hitch systems" ("the '067 Patent"). The '067 Patent discloses an apparatus for attaching either a gooseneck trailer hitch or a fifth wheel trailer hitch to a truck bed can include a single cross-member, a gooseneck ball receiver and a plurality of mounting pads. The single cross-member can be attached to first and second truck longitudinal frame rails. The gooseneck ball receiver can be coupled to the single cross-member and aligned with a gooseneck hitch opening in the truck bed. The plurality of mounting pads can be spaced apart from the single cross-member and can be attached to the frame rails independent of the single cross-member. The plurality of mounting pads can be aligned with a corresponding plurality of access openings in the truck bed. The single cross-member can be a suspension cross-member supporting at least first and second suspension members.

Although the above discussed disclosures are useful, the owner of the pickup truck understands that the placement of the hitch into, or its removal from, the pickup bed is problematic. The problem is primarily due to the weight and physical construction of the hitch. The fifth wheel hitches frequently weigh between 150 and 400 pounds. Some of the heavier hitches come apart to allow some level of increased ease in installation or removal. However, two individual components still weigh a great deal, and the process remains difficult. Installation or removal of the fifth wheel hitch generally requires two or more people at a minimum and extensive physical exertion. It is also dangerous to the people involved and could easily damage the hitch itself or the pickup bed. In order to connect or remove the fifth wheel hitch, one or two stronger individuals might be needed to lift the hitch out of the rails or factory prep system in the pickup bed and then carry the hitch to the back of the pickup bed and throw it onto the ground. Another way to connect or remove the fifth wheel hitch is by manually lifting the hitch up and carefully moving it out of the pickup bed onto the ground. Yet another way to connect or remove the fifth wheel hitch is placing chains around the hitch and using a separate power mechanism (e.g., tractor, winch system, system hooked above the pickup bed with a rolling device similar to an automotive engine lift-this requires overhead or rolling mechanisms that can reach over the pickup bed to be used). Additionally, if the hitch is carried to the rear of the pickup bed, then the hitch should be placed onto something for storage, another difficult process for something so heavy. Carrying the hitch down a ramp off the tailgate is possible, but again, risky. All of the above methods contain extensive physical risk to the user due to the weight and awkward configuration of a fifth wheel hitch in trying to lift it to install or remove from the pickup bed.

In recent times, fifth wheel hitch lifting devices have been developed that are essentially permanently-ceiling mounted bars having winch-type lift devices. The fifth wheel hitch lifting devices are controlled electronically. Here, cables descend from the winch device and connect to the fifth wheel hitch lifting device, which then are inserted into a fifth wheel hitch, and, with the hitch jaws closed and locked, provide the means to lift the hitch out of the pickup bed. This process requires, in addition to the product itself, a ceiling to mount it onto, electrical outlets, and storage capacity. The process lifts the hitch well into the air.

Therefore, there is a need in the art to provide an improved device that allows one individual to place a hitch into, or remove it from, a pickup bed by themselves, with limited physical exertion and bodily risk.

SUMMARY OF THE INVENTION

It is an object of the present invention to provide a device for moving a hitch into and out of a pickup bed that avoids the drawbacks of known hitch mounting systems or fifth wheel hitch lifting devices.

It is another object of the present invention to provide a device having elongated rails with wheels that allows to place hitch into, or remove it from, a pickup bed without outside or additional components while keeping the hitch much lower to the ground, preventing possible disasters from a drop of the hitch.

In order to overcome one or more objects, the present invention presents a device for moving a hitch on a pickup bed. The device includes a pair of elongated rails placed at a distance from one another. Each of the elongated rails includes slant sections extending outwardly and an angle from a distal end of the elongated rail. Each elongated rail includes flat sections extending from the slant section. Each of the elongated rails includes wheels positioned underneath the flat sections. The elongated rails position on the pickup bed of a towing vehicle such that the wheels are in contact with the pickup bed. The device includes a jack for lifting and lowering the hitch. The elongated rails receive the hitch, and the wheels are moved over the pickup bed for loading and unloading of the hitch from the pickup bed onto or from a specially developed rolling hitch carrier bench for storing the hitch when not in use.

In one aspect of the present invention, the device utilizes elongated rails when the hitch is already in the pickup bed. The device utilizes a small, electrically-powered jack placed to the side of the hitch. Here, the jack is used to lift one side of a hitch out of rail slots of bed rails (or factory prep holes) between 8 and 10 inches, while the other side of the hitch rotates up, but remains within rail slots of bed rails. While one side of the hitch is held up by the jack, one set of elongated rails is placed under the leg extensions of the legs of the hitch. The leg extensions of the legs of the hitch are then securely fastened onto the elongated rails. The jack is used to lower that raised side of the hitch onto that set of elongated rails which is resting on the pickup bed and the jack is removed from the first side of the hitch. Subsequently, the jack is placed on the other side of the hitch to lift and place the hitch over the other elongated rail. After placing the hitch on the apparatus having two elongated rails, the hitch is then sitting on and is attached to four wheels inside the pickup bed. This allows an owner of the pickup truck to roll the hitch to the back of the pickup bed. In one example, the device is configured to roll over the bed rails.

In one example, the pickup bed includes a space filler to cover the space between the pickup bed and a tailgate when the tailgate is down. The wheels continue to roll the hitch over the tailgate and onto a specifically developed rolling hitch carrier bench. The rolling hitch carrier bench allows for storage of the hitch outside of the pickup bed. An owner of a pickup vehicle or towing vehicle can use the pickup bed for other purposes until there is a need to reinstall the hitch again onto the pickup bed. The above process is reversed to install the hitch into the pickup bed.

In one advantageous feature of the present invention, the elongated rails position adjacent to the hitch and allows the use of the jack to lift the hitch from the bed rails and place the hitch onto the elongated rails. After placing, the wheels allow one individual to move the hitch without needing support from another individual. The jack is capable of holding up one side of the hitch while the other side of the hitch is being worked with.

In another advantageous feature of the present invention, the rolling hitch carrier bench allows for storage of the hitch outside of the pickup bed. As a result, the owner can use the pickup bed for other purposes until there is a need to reinstall the hitch again.

In another advantageous feature of the present invention, the hitch rests over the elongated rails while the wheels are in contact with the pickup bed. This ensures the hitch is kept much lower to the pickup bed preventing possible disasters from a drop of the hitch while moving the hitch.

In another advantageous feature of the present invention, the device allows a single individual to move the hitch on a towing vehicle's pickup bed without assistance from other individuals. Further, the device minimizes physical exertion and eliminates multiple risks posed by the hitch's weight and design. Further, the device also prevents accidental damage to the hitch itself while the hitch is being loaded onto or removed from the pickup truck.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

DETAILED DESCRIPTION OF THE PREFERRED EMBODIMENT

The following detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed device. However, it will be apparent to those skilled in the art that the presently disclosed invention may be practiced without these specific details. In some instances, well-known structures and devices are shown in functional or conceptual diagram form in order to avoid obscuring the concepts of the presently disclosed device.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention provides a description of a device, it is to be further understood that numerous changes may arise in the details of the embodiments of the device. It is contemplated that all such changes and additional embodiments are within the spirit and true scope of this disclosure.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure.

Various features and embodiments of a device for moving a hitch on a pickup bed are explained in conjunction with the description of FIGURES (FIGS. 1-14.

Figure 1:
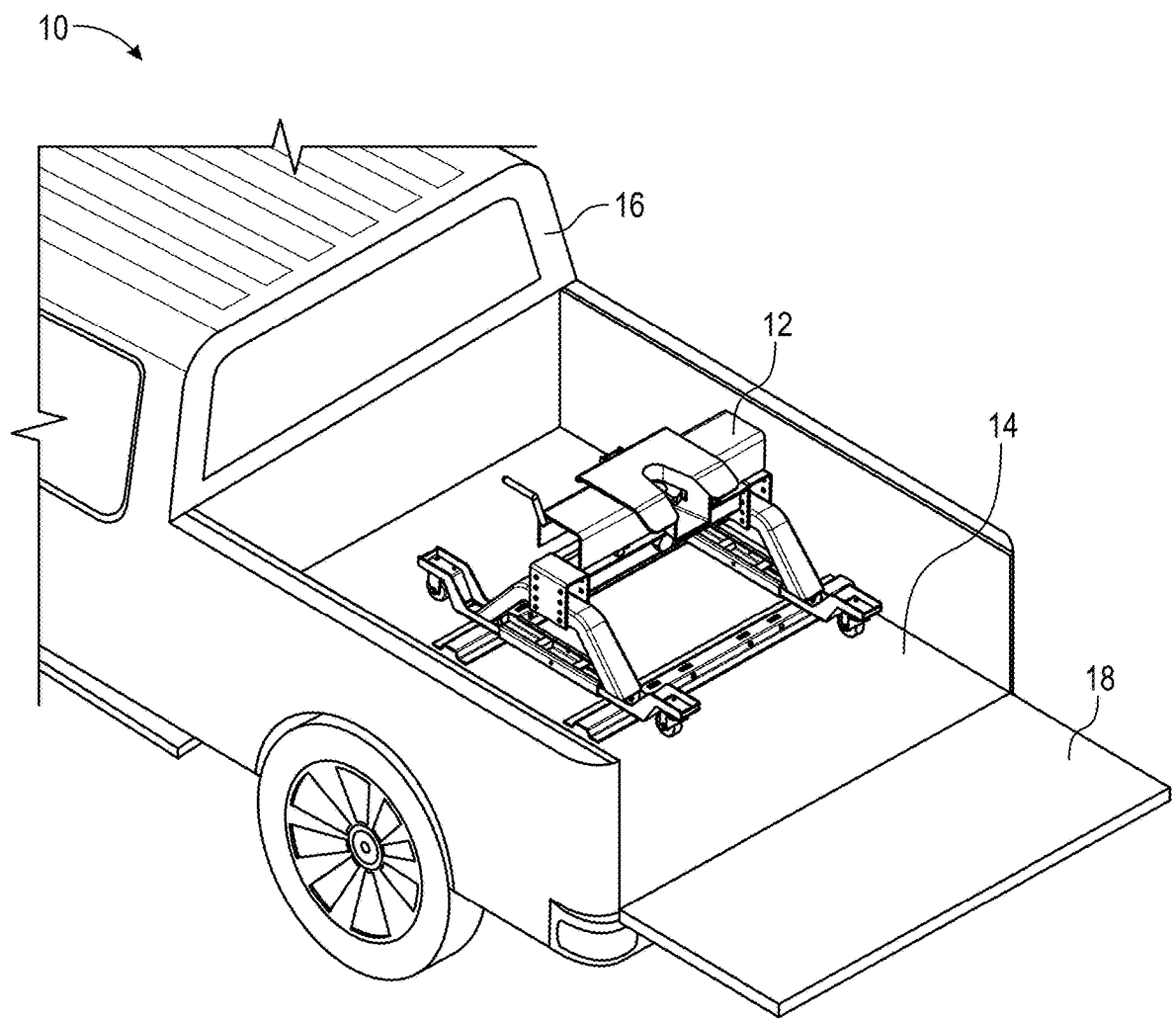
FIG. 1 illustrates an environment in which a device is positioned over a pickup bed of a towing vehicle and beneath a hitch, in accordance with one embodiment of the present invention.
Figure 2:
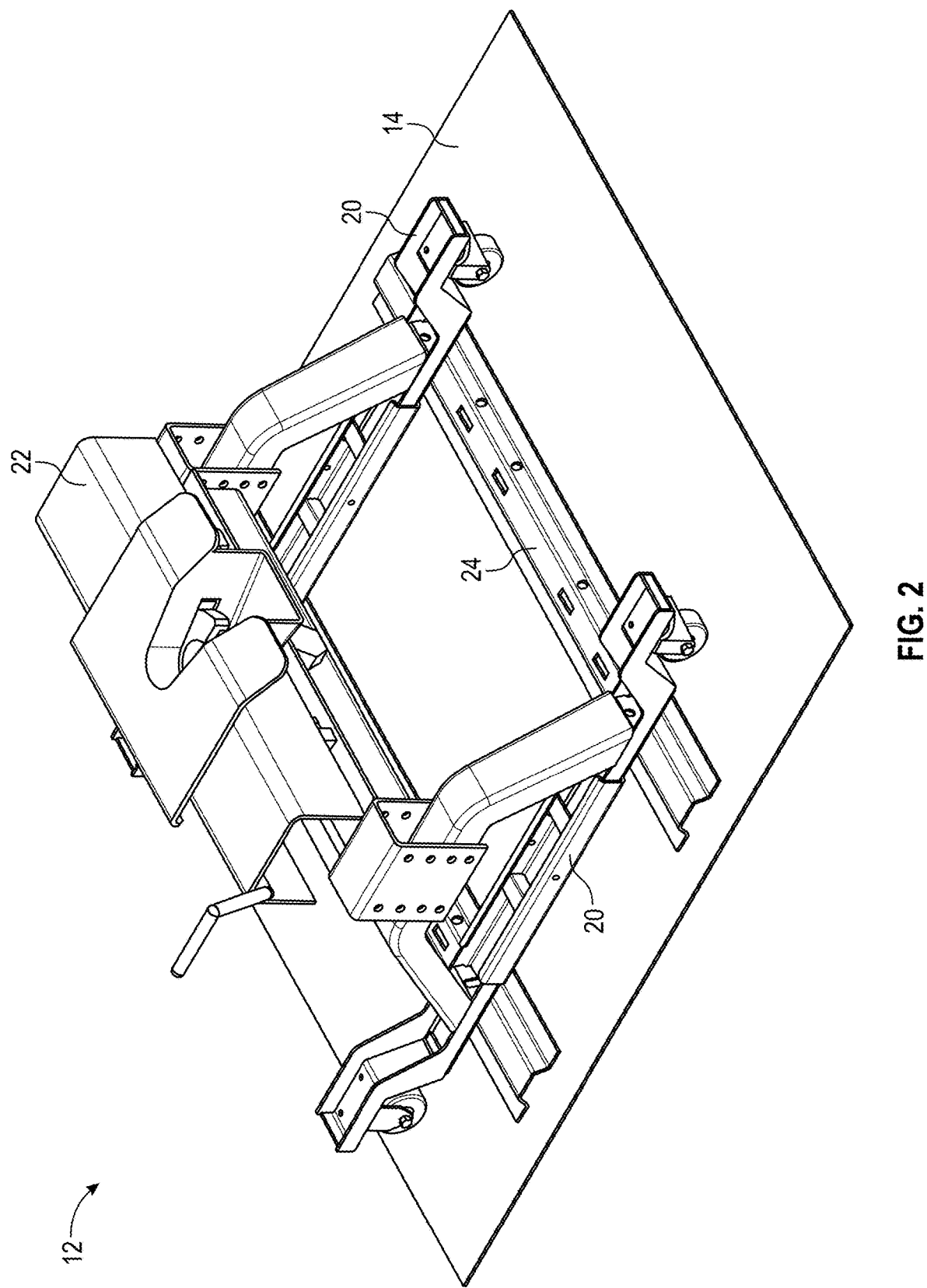
FIG. 2 illustrates a perspective view of the device having elongated rails receiving a hitch, in accordance with one embodiment of the present invention.

FIG. 1 shows an environment 10 in which a fifth wheel hitch assembly 12 is placed on a truck bed or pickup bed or pickup truck bed 14 of a pickup truck or towing vehicle or pickup vehicle 16, in accordance with one exemplary embodiment of the present invention. Pickup truck 16 includes a tailgate 18. As known, tailgate 18 presents a hinged opening at the back of pickup truck 16. FIG. 2 shows a perspective view of fifth wheel hitch assembly 12, in accordance with one embodiment of the present invention. Fifth wheel hitch assembly 12 includes a pair of support structures or apparatuses 20. For ease of reference, each support structure or apparatus 20 is referred to as apparatus 20 hereinafter. Apparatus 20 receives a hitch 22. In this exemplary embodiment, hitch 22 positions over bed rails 24 placed on pickup bed 14 in a standard rail setting. In the present invention, each apparatus 20 positions over rails 24 in a perpendicular configuration. Not shown is a hitch sitting on apparatus 20 configured for receiving a hitch used in a factory prep system.

Figure 3:
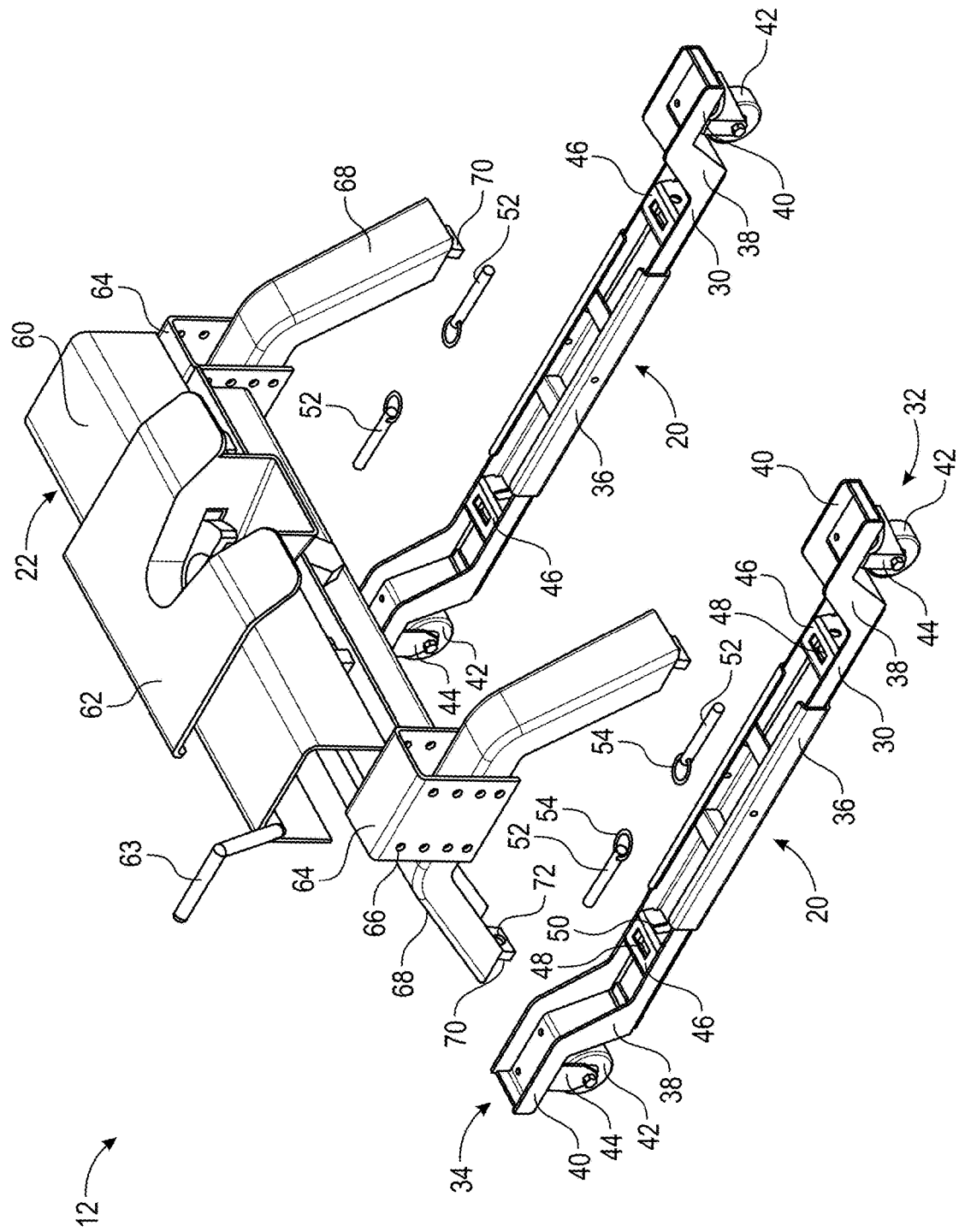
FIG. 3 illustrates an exploded view of the device and the hitch, in accordance with one embodiment of the present invention.

FIG. 3 shows an exploded view of apparatus 20 aligned with hitch 22, in accordance with one embodiment of the present invention. Apparatuses 20 are placed at a distance matching the distance between legs 68 of hitch 22. Each apparatus 20 includes an elongated rail 30. Elongated rail 30 comes in a straight configuration. Elongated rail 30 is made of metal or any other suitable material. Elongated rail 30 has a first end 32 and a second end 34. First end 32 indicates a front end and second end 34 indicates a rear end, or vice versa. In one example, a provision is made for elongated rails 30 to receive leg extensions 70 of legs 68 of hitch 22 in a manner that mimics or depicts the slots in the standard rails that receive the leg extensions as the standard rails are used to affix the hitch to the bed of the tow vehicle. It should be understood that the present disclosed apparatus 20 does not service or work with gooseneck connections. Each apparatus 20 includes a sleeve 36 at the center of elongated rail 30. The sleeve 36 allows the elongated rail to lengthen or shorten to accommodate any differences in the distance between legs on any particular hitch. In one example, elongated rail 30 comes as two parts and sleeve 36 helps to connect the proximate ends of elongated rail 30. In another example, elongated rail 30 comes without the need for sleeve 36. Each apparatus 20 includes slant sections 38.

Slant sections 38 extend outwardly and upwards at an angle from distal ends of elongated rail 30 at both first end 32 and second end 34. Further, slant sections 38 present flat sections 40. As can be seen, flat sections 40 extend from distal ends of slant sections 38 and position parallel to the surface i.e., pickup bed 14. Further, flat sections 40 include wheels 42 connected via casters 44. Here, wheels 42 position underneath flat sections 40. A person skilled in the art understands that slant sections 38 help to position flat sections 40 at a height to place wheels 42 underneath such that elongated rail 30 positions at a low height from pickup bed 14. In other words, slant sections 38 and flat sections 40 are designed to place wheels 42 underneath slant sections 38 in order to provide sufficient gap between elongated rail 30 and pickup bed 14.

Further, elongated rail 30 includes one or more hitch receiving blocks 46. In one example, elongated rail 30 includes two hitch receiving blocks 46, each positioned at a distance for receiving legs 68 of hitch 22. Each hitch receiving block 46 includes a leg extension receiving member 48 at the top facing upwards, and a pin hole 50 at the side. Here, extension receiving member 48 indicates a hole on elongated rail 30 that configures to receive leg extensions 70 of legs 68. Receiving blocks 46 used for hitches having leg extensions on their legs that utilize (fit) holes 48 in standard rails are replaced with different receiving blocks 46 having extension receiving members 48 that conform to those used in factory prep systems. It should be understood that leg extension receiving member 48 and pin hole 50 intersect for receiving a pin 52 in order to secure hitch 22 to apparatus 20. Pin 52 indicates an elongated rod having a ring 54 at one end. In one example, pin 52 includes a small hole (not shown) toward the opposite end of (or away from) ring 54. The hole receives another pin (not shown) that keeps pin 52 from coming out of hole 50. Here, another pin provides a recessed area toward one end, allowing for a clip to go over the recessed area, after pin 52 is inserted into place, and achieving the same result of keeping pin 52 from coming out while in use. When hitch 22 is placed over hitch receiving block 46 via leg extension receiving member 48, pin 52 inserts through pin hole 50 and helps to secure hitch 22 to apparatus 20, as can be seen from at least FIG. 2. Ring 54 helps a user to pull pin 52 away from pin hole 50.

Fifth wheel hitches vary in designs due to different manufacturers and customers' preferences. However, the essential hitch purposes and utilizations are to: (1) securely attach the hitch to a tow vehicle; (2) securely receive and attach to the pin box kingpin extending down from the front of the fifth wheel trailer; (3) provide for raising or lowering pin box attachment mechanisms; (4) provide, in some instances, for the hitch to move forward or back in the tow vehicle bed; and (5) provide applicable stability and strength for the tow vehicle to be able to hold and haul the fifth wheel trailer. Still referring to FIG. 3, fifth wheel hitch assembly 12 includes exemplary hitch 22 which contains the appropriate hitch requisites noted above. Hitch 22 includes a head 60. Head 60 has a skid plate 62 at the top for absorbing the friction and impact forces at the time of installing and uninstalling a fifth wheel trailer (not shown) to hitch 22. Head 60 includes a hitch handle 63 used for engaging or disengaging a locking mechanism that holds a kingpin of the fifth wheel trailer. Further, the head 60 rests on a base which includes a support cross beam allowing the head 60 to have a limited tilt/pivot capacity (forward to back and left to right). Further, the hitch base includes brackets 64 at both distal ends. Brackets 64 include bracket holes 66 that allow the raising or lowering of the head 60 for proper head leveling. Further hitch base includes hitch legs 68 extending from brackets 64. Brackets 64 include bracket holes 66. Further, hitch 22 includes hitch legs 68 extending from brackets 64. Legs 68 include leg extensions 70. Leg extensions 70 extend from the bottom of legs 68. Each leg extension 70 includes a hitch connecting hole 72. In one implementation, leg extensions 70 help to connect hitch 22 to apparatus 20 or rails 24. In order to connect hitch 22 to apparatus 20, leg extensions 70 are inserted into hitch receiving blocks 46 via leg extension receiving members 48. Here, leg extensions 70 position inside leg extension receiving members 48 such that hitch connecting hole 72 aligns with pin hole 50. Subsequently, the user inserts pin 52 through pin hole 50 and hitch connecting hole 72 to secure hitch 22 to apparatus 20. A person skilled in the art understands that elongated rails 30 can be shortened or lengthened from each other (by using a mid-piece) to accommodate different distances between hitch legs 68 depending on the need or different manufacturers specifications without departing from the scope of the present invention.

Figure 4:
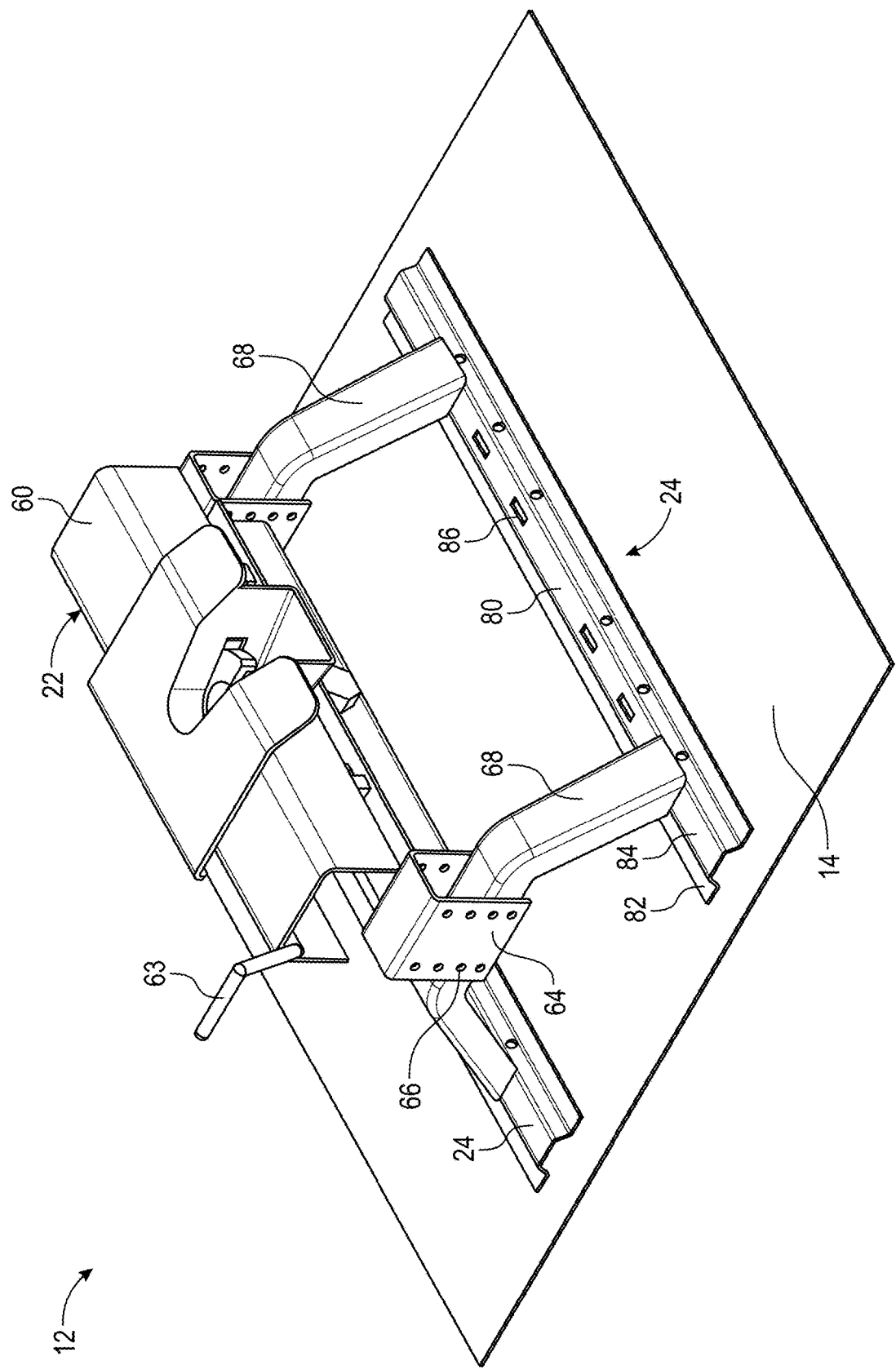
FIG. 4 illustrates the hitch placed over bed rails positioned on the pickup bed (or factory prep holes cut into the pickup bed-not shown), in accordance with one embodiment of the present invention.

In one embodiment, hitch 22 connects to the pickup truck, or tow vehicle, bed 14 by a pair of bed rails 24, as shown in FIG. 4. Bed rails 24 are placed at a distance similar to the distance between legs 68 of hitch 22. Bed rails 24 indicate standard rails. Bed rails 24 include a bed frame 80 having a base section 82 and a raised section 84. Base section 82 rests over pickup bed 14 and raised section 84 positions at a height and at an angle while presenting a flat section with respect to pickup bed 14. Raised section 84 includes a plurality of rail slots 86. Rail slots 86 are configured to receive leg extensions 70 of hitch 22 in order to connect hitch 22 to bed rails 24.

Now referring to FIG. 4 through FIG. 8, placing hitch 22 over bed rails 24 and lifting hitch 22 to place over apparatus 20 in order to move hitch 22 from pickup truck 16 is explained. As specified above, FIG. 4 shows the feature of hitch 22 placed over bed rails 24. Here, leg extensions 70 insert in rail slots 86 of bed rails 24. In order to place hitch 22 over apparatus 20, a jack 90 such as an electric or hydraulic or mechanical jack may be used. A person skilled in the art understands that jack 90 includes any mechanical or electromechanical jack or electronic jack without departing from the scope of the present invention. Optionally, jack 90 includes a traditional jack that is known in the art. Exemplary jack 90 herein includes a base 92 and an electric motor 98 and a telescoping extension portion (tube, rod or post) 94. Further, a jack bracket 96 is added to jack 90 at the furthest end of jack telescoping extension portion 94. Jack bracket 96 includes a connector pin (not shown) connecting it to the furthest end of telescoping portion of the jack 90. Jack bracket 96 then operatively connects to the bottom of the hitch bracket 64 in this exemplary embodiment by utilizing lip (not shown) that extends 90 degrees out from the bottom of jack bracket 96, toward the hitch 22, which slides under an extension of the hitch 22. In other words, jack bracket 96 is a mechanism that works between jack 90 and hitch 22, to lift the side of hitch 22. Jack bracket 96 operates as follows: jack bracket 96 has a short 90 degree bend/lip at its top that faces toward the jack 90 outward and away from hitch 22. The top lip attaches to the top of jack 90 by either a clip or other manner so that jack bracket 96 moves up as jack 90 extends. Further, jack bracket 96 also has a short 90 degree bend/lip at its bottom that faces toward hitch 22 inward and away from jack 90. This bottom lip slips under an appropriate component of hitch 22 on that side that causes that side of hitch 22 to be lifted up as jack 90 extends upward. Jack bracket 96 is constructed (it may well start out to be two pieces with a sliding component that can be tightened by bolts to a desirable length) to allow for it to be lengthened or shortened as necessary to accommodate different hitch designs.

A person skilled in the art understands as hitches vary in construction and appearance the lip of the jack bracket 96 may be placed in varying locations on different hitches as to achieve the same lifting effect. A person skilled in the art further understands the exact form of an electric jack may vary from that described herein. Jack 90 in the current example is powered by direct current received from the battery power of the pickup truck itself and conveyed through a seven-way trailer hitch receptacle located in the bed of the pickup truck (not shown). Jack 90 receives direct current electric power through a power cable 120 that has an on-off power-switch 122 and a seven-way trailer plug 124 at its distant end. Power cable 122 runs from jack 90 and is plugged into seven-way trailer plug receptacle 124 that is in the pickup truck bed (not shown).

Figure 11:
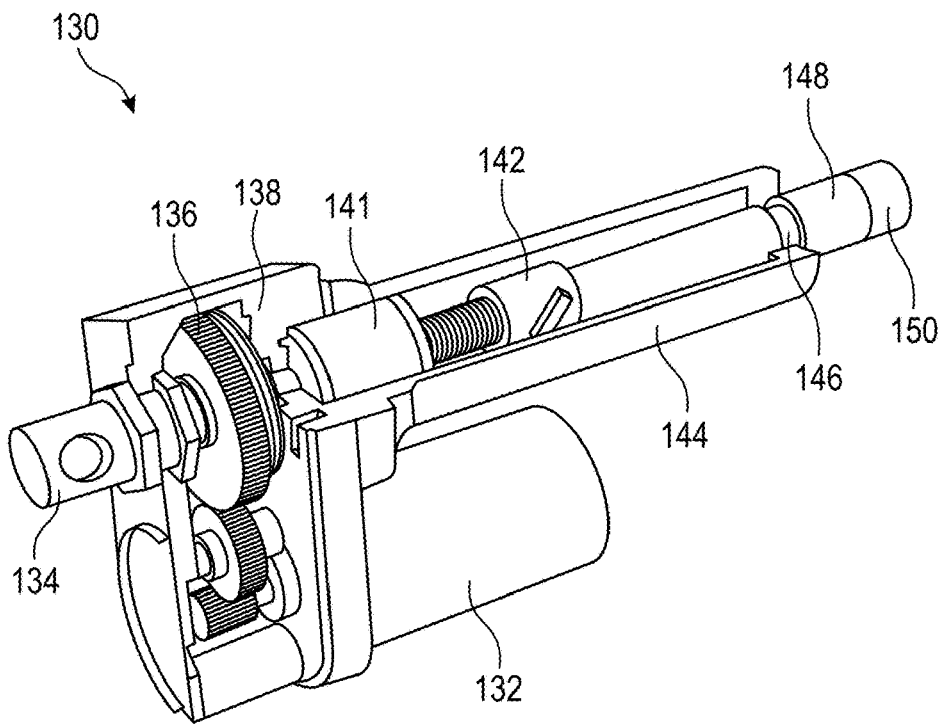
FIG. 11 illustrates is an actuator jack, in accordance with one embodiment of the present invention.

FIG. 11 shows an exemplary electric jack 130, (similar to jack 90). Electric jack 130 includes a motor 132, a rear mount 134, a gearing 136, an overload clutch 138, a load holding brake 141, a ball nut 142, a cover tube 144, a wiper 146, an extension tube 148 and a front mount 150. Here, motor 132 operates gearing 136 to allow extension tube 148 to extend for lifting hitch 22.

Further, jack 90 includes a jack bracket 96. Jack bracket 96 operatively connects to bracket 64 i.e., by the lip extension of the jack bracket 96 being placed under the bracket 64. In one example, jack 90 includes a cable 120 for supplying power required to operate jack 90.

Figure 12:
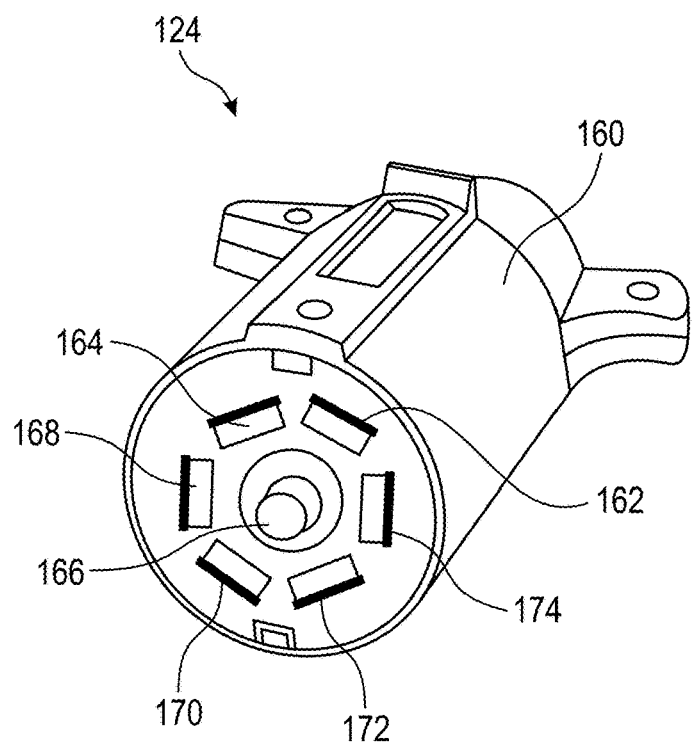
FIG. 12 illustrates is seven-way trailer hitch pin, in accordance with one embodiment of the present invention.

FIG. 12 shows a side perspective view of seven-way trailer plug 124, in accordance with one exemplary embodiment of the present invention. Seven-way trailer plug 124 includes a housing 160 having a first pin 162, a second pin 164, a third pin 166, a fourth pin 168, a fifth pin 170, a sixth pin 172 and a seventh pin 174. First pin 162 indicates a tail light pin, second pin 164 indicates a 12-volt auxiliary pin, third pin 166 indicates a reverse light pin, fourth pin 168 indicates right turn/stop pin, fifth pin 170 indicates electric brake pin, sixth pin 172 indicates a ground, and seventh pin 174 indicates a left turn/stop pin. A person skilled in the art understands that only two pins acting as a power and a ground are all required to distribute the proper power to the jack for its purpose.

Figure 5:
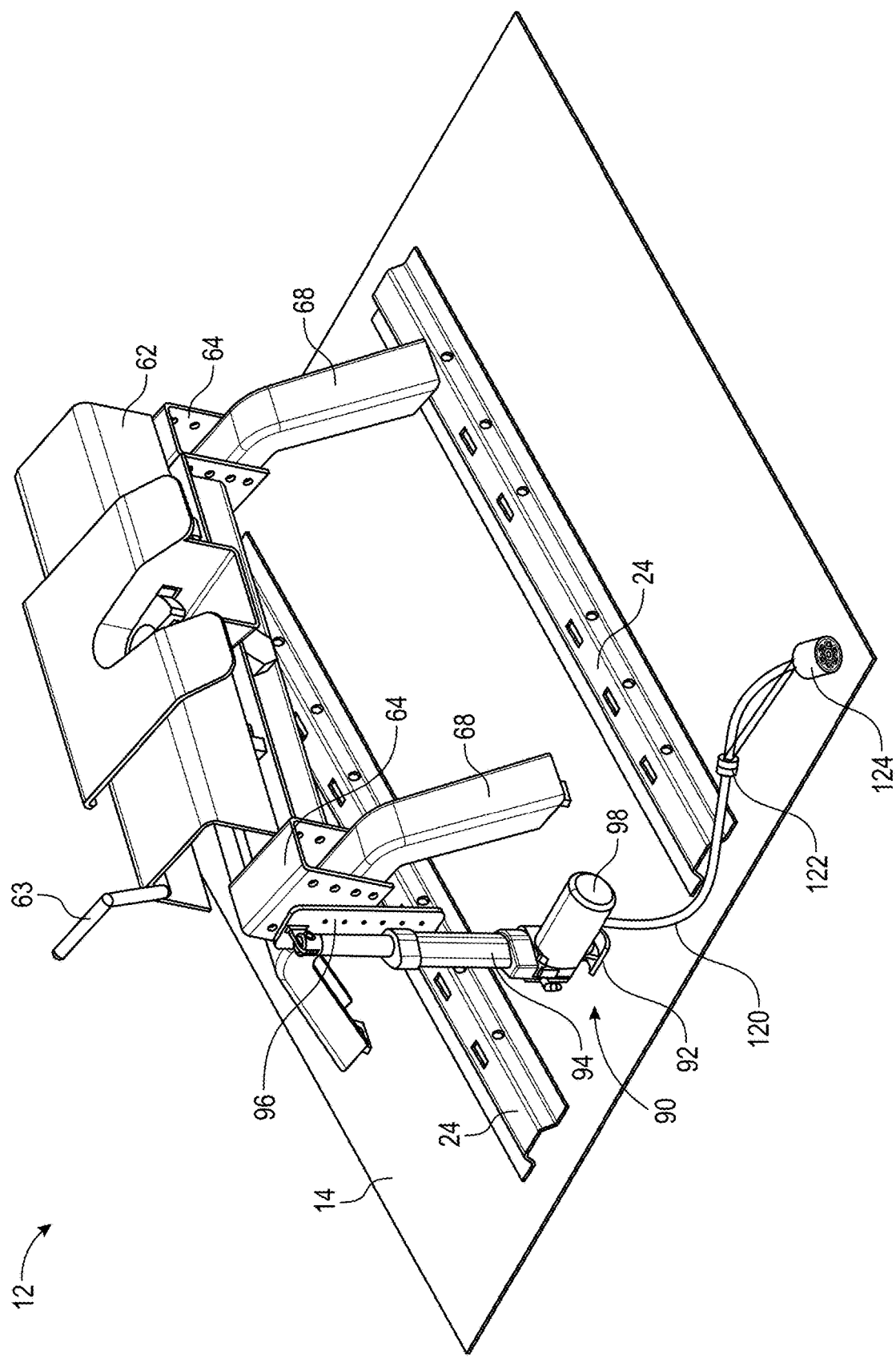
FIG. 5 illustrates a jack used for lifting one side of the hitch, in accordance with one embodiment of the present invention.
Figure 6:
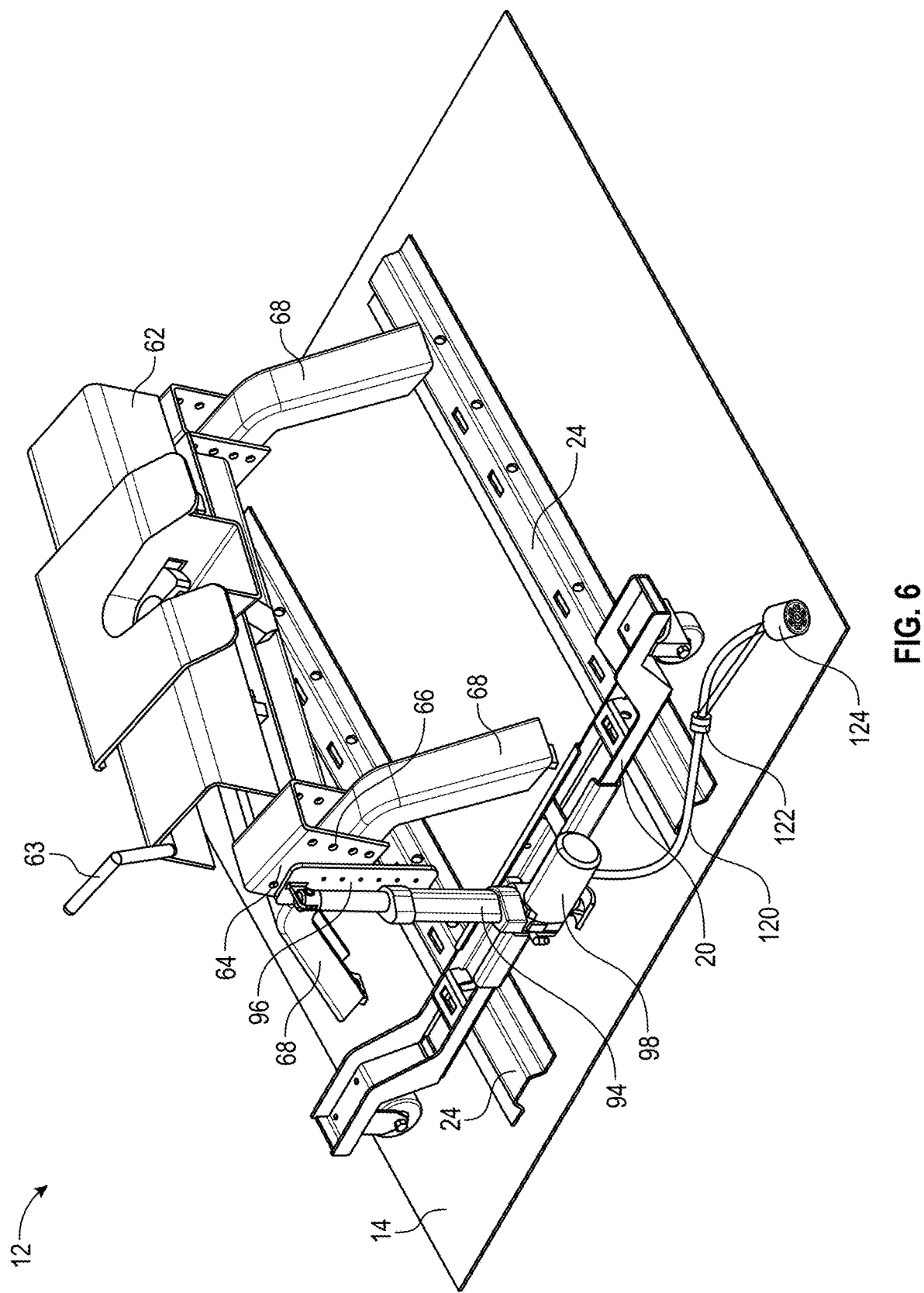
FIG. 6 illustrates the jack used for lifting one side of the hitch in order to place the hitch over the elongated rail, in accordance with one embodiment of the present invention.
Figure 7:
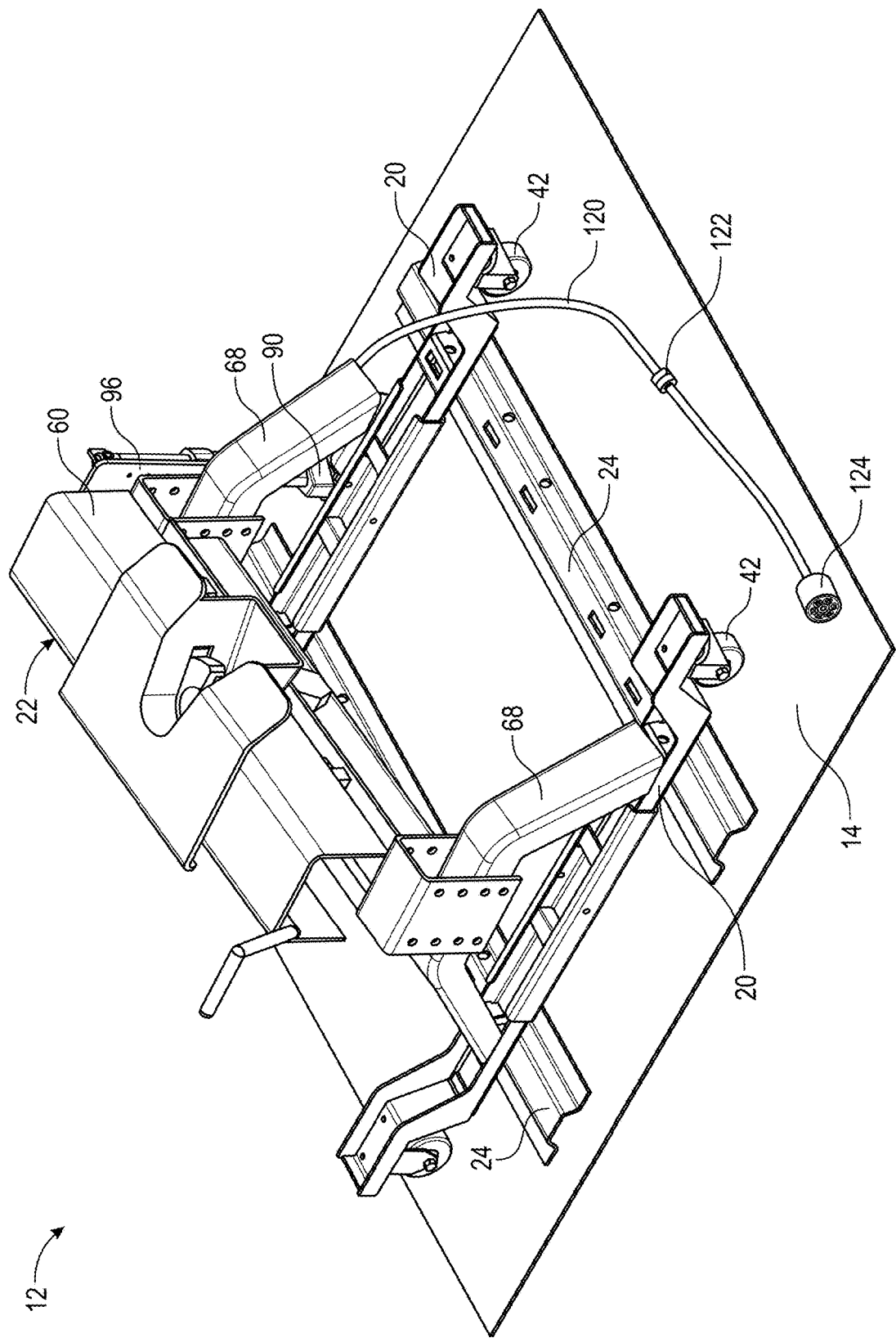
FIG. 7 illustrates the jack used lifting for lifting opposite side of the hitch in order to place the hitch over the elongated rail, in accordance with one embodiment of the present invention.
Figure 8:
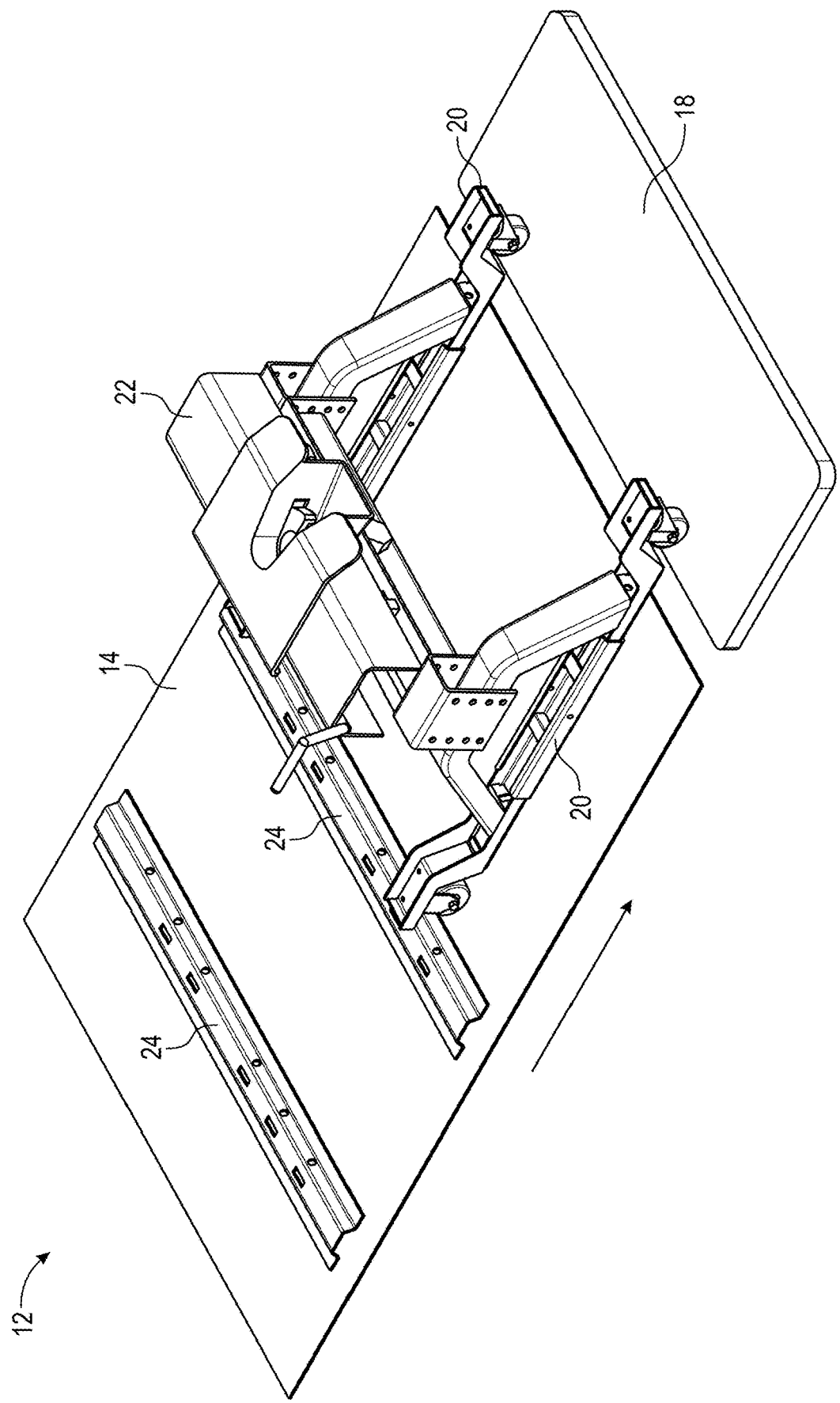
FIG. 8 illustrates the device used for moving the hitch towards a tailgate of the towing vehicle, in accordance with one embodiment of the present invention.

FIG. 5 shows the feature of jack 90 used to lift hitch 22 in order to place apparatus 20 underneath legs 68 of hitch 22. Here, the 90 degree lip extension connector of jack bracket 96 is placed under the bottom and connects to bracket 64. Subsequently, jack 90 is operated to lift one side of hitch 22. In one example, hitch 22 is lifted between 8 and 10 inches from pickup bed 14. As can be seen, jack 90 lifts one side of hitch 22 out of rail slots 86 while the other side of hitch 22 rotates up but remains within rail slots 86 of bed rails 24. While one side of hitch 22 is lifted up, apparatus 20 is placed under legs 68 of hitch 22 and leg extensions 70 at legs 68 of hitch 22 are placed over apparatus 20, as shown in FIG. 6. Subsequently, jack 90 is positioned on the other side of hitch 22 as shown in FIG. 7. Here, jack 90 is connected to hitch 22 by bracket 96, and hitch 22 is raised to place apparatus 20 underneath legs 68 of hitch 22, as specified above. At this point, hitch 22 sits on four wheels 42 inside pickup bed 14. After placing hitch 22 over both apparatuses 20 and securing the hitch 22 to the apparatuses 20 by using all the locking pins and mechanisms discussed above, the user rolls hitch 22 to the back of pickup bed 14 towards tailgate 18, as shown in FIG. 8. In one example, a space filler (not shown) is used to cover the space between pickup bed 14 and tailgate 18, when tailgate 18 is down. This allows wheels 42 to continue to roll hitch 22 over tailgate 18 and onto a specifically developed rolling hitch carrier bench 100.

Figure 9:
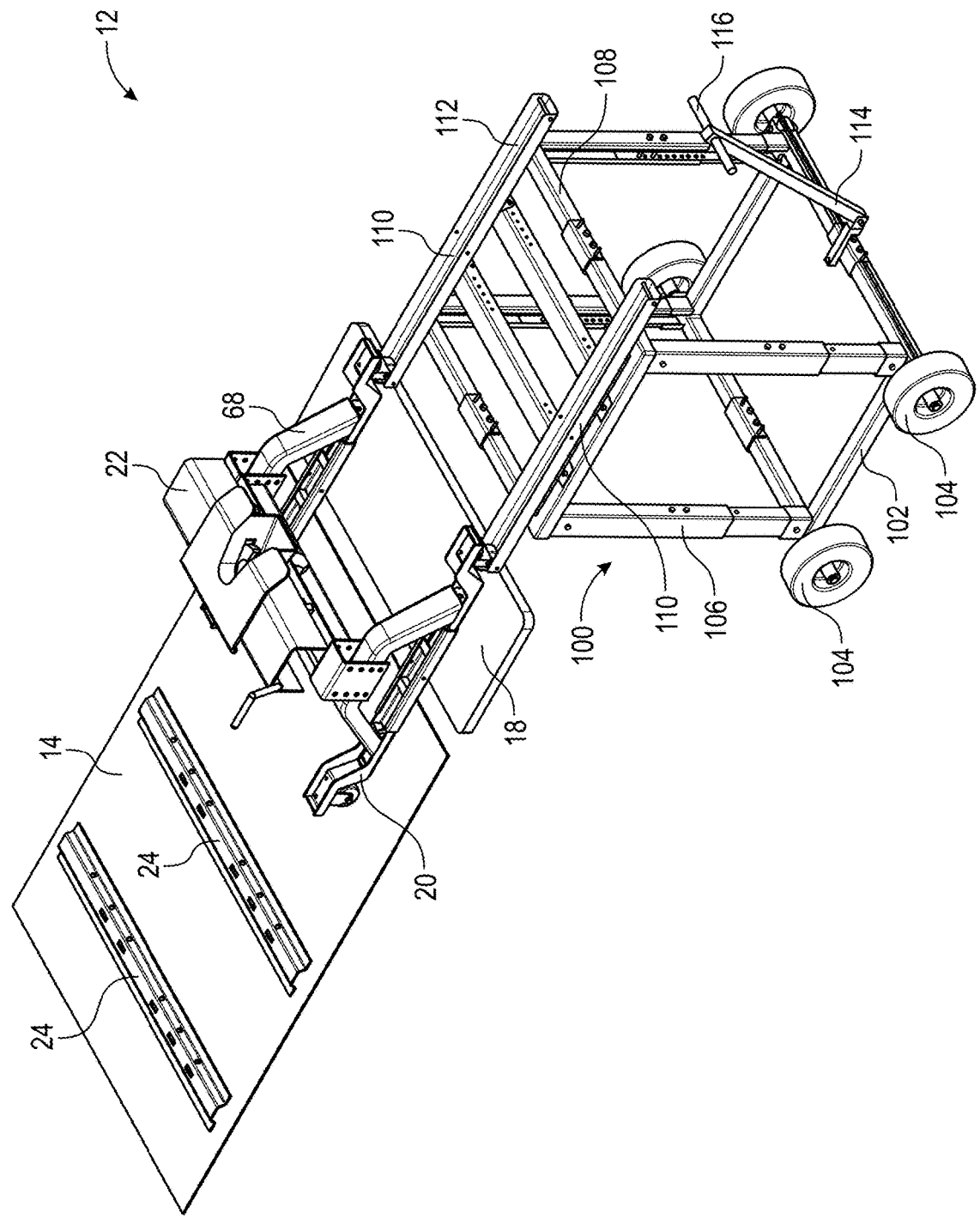
FIG. 9 illustrates the device aligned with a rolling hitch carrier bench, in accordance with one embodiment of the present invention.

FIG. 9 shows a rolling hitch carrier bench 100, in accordance with one embodiment of the present invention. Rolling hitch carrier bench 100 includes a base frame 102 having carrier wheels 104. Further, base frame 102 includes upstanding poles 106 extending upward from base frame 102. At the top of upstanding poles 106, rolling hitch carrier bench 100 includes a top frame 108. In one example, top frame 108 includes a carrier frame 110 at the top. Carrier frame 110 includes a carrier rail 112. In addition, base frame 102 includes a carrier lever 114 having a handle 116. Handle 116 helps the user to pull rolling hitch carrier bench 100 with support by carrier wheels 104.

Figure 10:
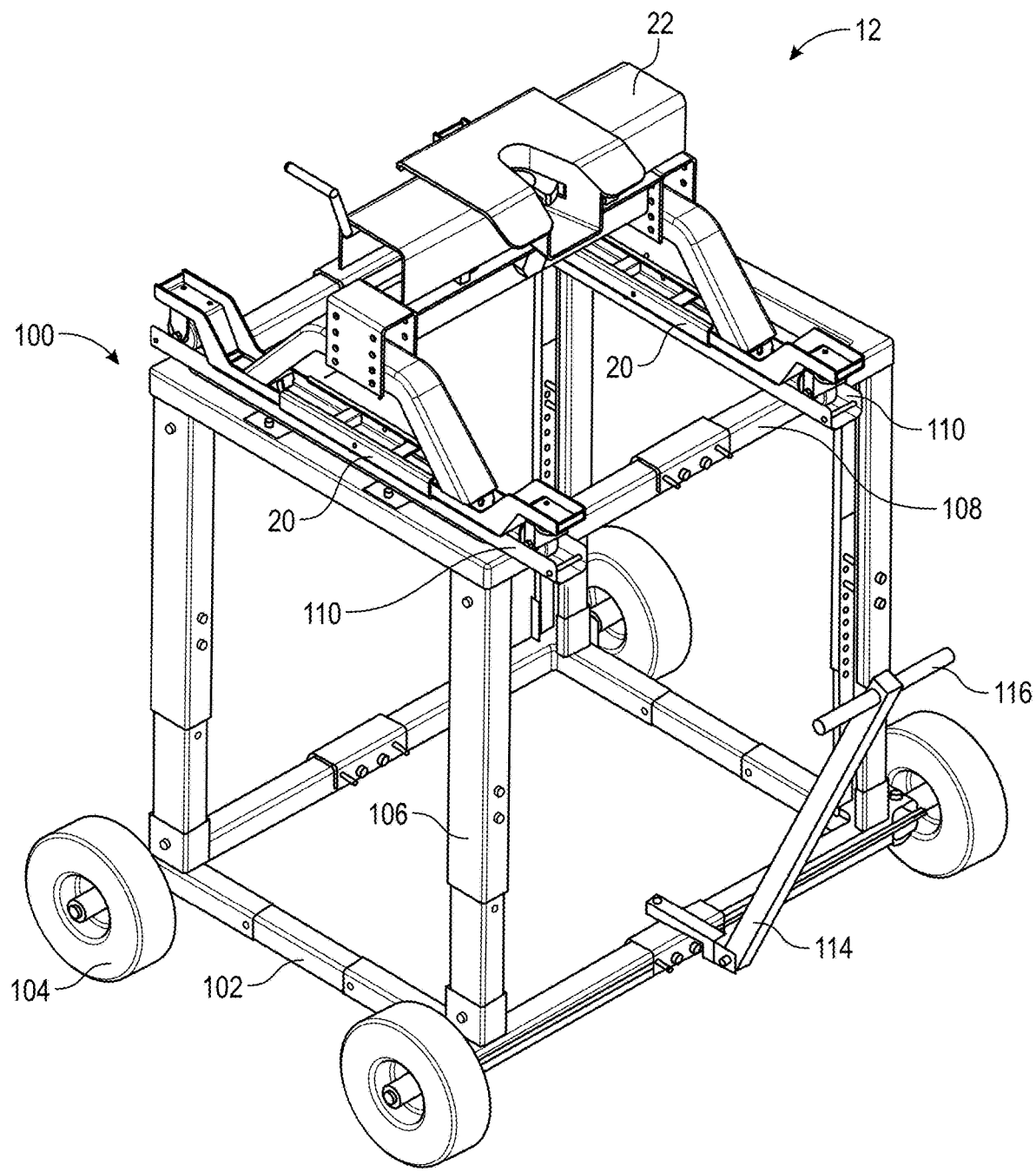
FIG. 10 illustrates the device placed over the rolling hitch carrier bench for holding the hitch when not in use, in accordance with one embodiment of the present invention.

In the present invention, rolling hitch carrier bench 100 aligns with pickup truck 16 such that wheels 42 continue to roll and come over carrier rail 112 when wheels 42 go past tailgate 18. It should be understood that rolling hitch carrier bench 100 is designed to allow variations in height to match the height of the open tailgate 18 of pickup truck 16. It should be understood that rolling hitch carrier bench 100 can be configured to position the top level higher or lower, depending on the height of tailgate 18 of pickup truck 16 from the ground. Rolling hitch carrier bench 100 can also have the capacity for the carrier rails 112 to be either closer or farther apart, depending on the distance between the pair of apparatuses 20. In some implementations, rolling hitch carrier bench 100 may have a couple of mechanisms to prevent hitch 22, while sitting on apparatus 20 sitting in carrier rails 112 (on the carrier bench) from slippage. FIG. 10 shows the feature of wheels 42 positioned over carrier rail 112. As can be seen, rolling hitch carrier bench 100 receives apparatuses 20 at the top and helps to store hitch 22 outside of pickup bed 14. This allows the user to use pickup bed 14 for other purposes until there is a need to reinstall hitch 22 again.

In order to install hitch 22 to bed rails 24 at pickup bed 14, the user aligns rolling hitch carrier bench 100 with pickup bed 14. Subsequently, the user moves apparatuses 20 holding hitch 22 via wheels 42. After reaching bed rails 24, the user uses jack 90 to lower each side of hitch 22 onto bed rails 24 (as shown in FIG. 4).

Figure 13:
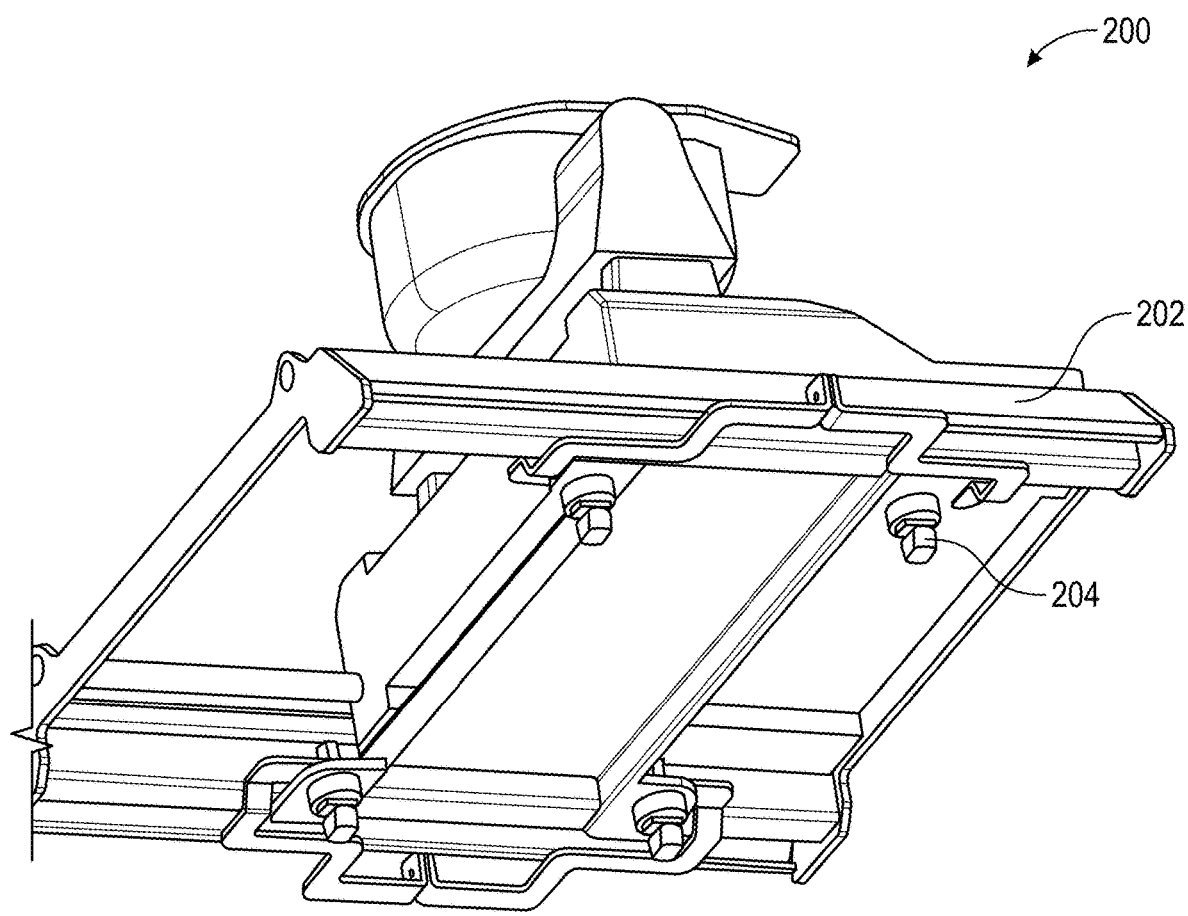
FIG. 13 illustrates a bottom perspective view of a fifth wheel hitch with legs constructed to use with a factory prep system in the bed of a pickup, and having different leg extension shapes compared to hitches using the standard rail system, in accordance with another embodiment of the present invention.
Figure 14:
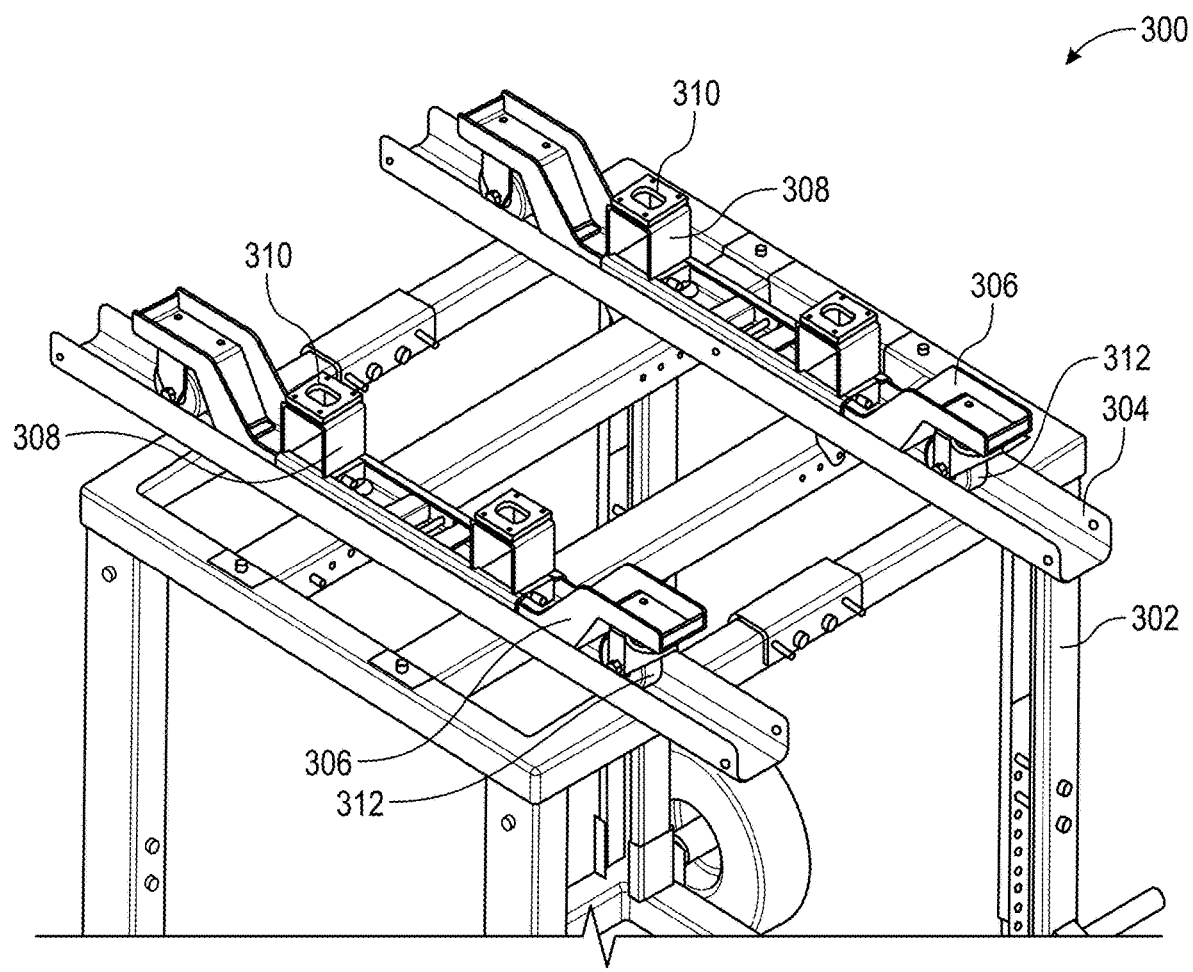
FIG. 14 illustrates elongated rails having modified receivers able to allow the factory prep system leg extensions to be inserted and locked onto the modified receivers on the elongated rails, differentiated from a hitch using leg extensions for standard rails as depicted in FIG. 6.

Now referring to FIG. 13, a bottom perspective view of an exemplary fifth wheel hitch 200 having legs 202 constructed to use with a factory prep system in the bed of a pickup, and having different leg extensions 204 shape compared to hitches using the standard rail system is shown, in accordance with another embodiment of the present invention. Here, leg extensions 204 extend at the bottom of fifth wheel hitch 200. Further, FIG. 14 shows a rolling hitch carrier bench 300 configured to receive fifth wheel hitch 200. Rolling hitch carrier bench 300 includes a frame 302. Frame 302 includes a carrier rail 304 (similar to carrier rail 112). Carrier rail 304 receives an apparatus 306 having wheels 312 (similar to apparatus 20 having wheels 42). In the present embodiment, apparatus 306 presents blocks 308. Blocks 308 extend from the top of apparatus 306. Each block 308 includes a leg extension receiving section 310 (or hole) that receives a leg extension 204 of fifth wheel hitch 200. Apparatus 306 operates similar to apparatus 20 enabling a single to user to position and remove fifth wheel hitch 200 from a pickup truck.

In the above description, FIGS. 1-10 reflect an example fifth wheel hitch assembly of open design that attaches to standard rail structures in a pickup bed. For presentation purposes this example fifth wheel hitch assembly is used throughout the application. FIG. 13 reflects an example of that portion of a fifth wheel hitch assembly that works with a factory prep system of attachment to a pickup bed and reflects leg extensions distinct from those used for standard rail attachments. FIG. 14 reflects examples of hitch receiving members used to affix those factory prep leg extensions to the device.

The presently disclosed device provides several advantages over the prior art. The device allows one user to place the hitch into, or remove it from, the pickup bed with limited physical exertion. The device helps to avoid any outside or additional components. The device helps to keep the hitch much lower to the ground, preventing possible disasters from a drop of the hitch. The device utilizes a small, electrically or hydraulically or mechanically operated jack placed to the side of the hitch. The jack lifts one side of a hitch out of the bed rail and helps to place the hitch on one of the apparatuses, while the other side of the hitch remains on the bed rails. Lifting one side avoids the heavy hitch from being lifted vertically that might possibly lead to falling on the pickup bed. The jack is then removed such that the hitch sits on four wheels of the apparatuses inside the pickup bed. This allows the user of the pickup truck to roll the hitch to the back of the pickup bed and then onto a specifically developed rolling hitch carrier bench. The rolling hitch carrier bench can be used as a storage of the hitch outside of the pickup bed. This allows the user to use the pickup bed for other purposes until that time comes to reinstall the hitch again.

A person skilled in the art appreciates that the device can come in a variety of shapes and sizes depending on the need and comfort of the user. Further, many changes in the design and placement of components may take place without deviating from the scope of the presently disclosed device.

In the above description, numerous specific details are set forth such as examples of some embodiments, specific components, devices, and methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

I claim:

1. A device for moving a hitch on a pickup bed, said device comprising:
a pair of elongated rails placed at a distance from one another and positioned in proximity to a floor of said pickup bed, each of said elongated rails comprising:
slant sections extending outwardly and upwards at an angle from distal ends of said elongated rail;
flat sections extending from respective slant section; and
wheels positioned underneath said flat sections; and
hitch receiving blocks positioned within each of said elongated rails, wherein each of said hitch receiving blocks comprises a leg extension receiving member facing upwards, and wherein said leg extension receiving member is configured to receive a leg extension of leg extensions of said hitch,
wherein said elongated rails position on said pickup bed of a towing vehicle such that said wheels are in contact with said pickup bed, and wherein said elongated rails receive said hitch and allow movement over said pickup bed for loading and unloading of said hitch from said pickup bed.

2. The device of claim 1, wherein each of said hitch receiving blocks comprises a pin hole positioned perpendicularly to and intersecting said leg extension receiving member.

3. The device of claim 2, further comprising a plurality of pins, wherein a pin of a plurality of pins is configured to insert through said pin hole at respective hitch receiving block for connecting said leg extension to said elongated rail.

4. The device of claim 3, wherein each of said leg extension comprises a hitch connecting hole, and wherein said pin of said plurality of pins inserts through said pin hole and said hitch connecting hole for connecting said leg extension to said elongated rail.

5. The device of claim 1, wherein each of said elongated rails comprises a sleeve.

6. The device of claim 1, further comprising a jack having a jack bracket, wherein said jack bracket is configured to lift said hitch from bed rails, and lower said hitch onto said elongated rails.

7. The device of claim 1, further comprises a rolling hitch carrier bench, wherein said rolling hitch carrier bench positions adjacent to said towing vehicle, and wherein said rolling hitch carrier bench receives said device.

8. The device of claim 7, wherein said rolling hitch carrier bench comprises a carrier lever having a handle, and wherein said handle helps to move said rolling hitch carrier bench.

9. The device of claim 7, wherein said rolling hitch carrier bench comprises carrier rails at a top of said rolling hitch carrier bench, wherein said carrier rails receive said wheels of said device and helps to store said device over said rolling hitch carrier bench, and wherein said elongated rails are affixed to said rolling hitch carrier bench using pins and clips to prevent slippage on said rolling hitch carrier bench.

10. The device of claim 7, wherein said rolling hitch carrier bench comprises a base frame having carrier wheels, wherein said base frame comprises upstanding poles connecting a top frame, wherein said top frame comprises a carrier rail, wherein said carrier rail receives said wheels of said device and helps to store said device over said rolling hitch carrier bench.

11. The device of claim 10, wherein said base frame comprises a carrier lever having a handle, and wherein said handle helps to move said rolling hitch carrier bench.

12. A method of providing a device for moving a hitch on a pickup bed, said method comprising the steps of:

providing a pair of elongated rails placed at a distance from one another and positioned in proximity to a floor of said pickup bed;

providing slant sections, each extending outwardly and upwards at an angle from distal ends of each of said elongated rails;

providing flat sections extending from respective slant section;

providing wheels underneath said flat sections;

providing hitch receiving blocks positioned within each of said elongated rails;

providing a leg extension receiving member facing upwards at each of said hitch receiving blocks, said leg extension receiving member being configured to receive a leg extension of leg extensions of said hitch;

positioning said elongated rails on said pickup bed of a towing vehicle such that said wheels are in contact with said pickup bed; and receiving said hitch over said elongated rails and moving said wheels over said pickup bed for loading and unloading of said hitch from said pickup bed.

\* \* \* \* \*